US010051789B2

(12) United States Patent
Tonutti

(10) Patent No.: US 10,051,789 B2
(45) Date of Patent: Aug. 21, 2018

(54) SIDE-DELIVERY RAKE

(71) Applicant: Tonutti Wolagri Highlight S.R.L., Remanzacco (IT)

(72) Inventor: Carletto Tonutti, Tricesimo (IT)

(73) Assignee: Tonutti Wolagri Highlight S.R.L., Remanzacco (IT)

( * ) Notice: Subject to any disclaimer, the term of this patent is extended or adjusted under 35 U.S.C. 154(b) by 328 days.

(21) Appl. No.: 13/718,314

(22) Filed: Dec. 18, 2012

(65) Prior Publication Data

US 2013/0160421 A1    Jun. 27, 2013

(30) Foreign Application Priority Data

Dec. 21, 2011  (IT) .................................. 2011A0208

(51) Int. Cl.
*A01D 80/00* (2006.01)
*A01D 78/00* (2006.01)

(52) U.S. Cl.
CPC .................................. *A01D 78/001* (2013.01)

(58) Field of Classification Search
CPC ............................ A01D 78/144; A01D 78/146
USPC ..................................... 56/365–392; 172/311
See application file for complete search history.

(56) References Cited

U.S. PATENT DOCUMENTS

| | | | |
|---|---|---|---|
| 1,435,293 A * | 11/1922 | Grieves | 56/367 |
| 4,753,063 A | 6/1988 | Buck | |
| 5,155,986 A | 10/1992 | Kelderman | |
| 5,740,870 A * | 4/1998 | Rodgers et al. | 172/456 |
| 5,960,620 A * | 10/1999 | Wright et al. | 56/377 |
| 6,405,517 B1 | 6/2002 | Peeters | |
| 7,854,271 B2 * | 12/2010 | Naylor et al. | 172/126 |
| 8,001,755 B2 * | 8/2011 | Menichetti et al. | 56/377 |
| 8,468,655 B2 * | 6/2013 | Borkgren et al. | 16/348 |
| 2001/0006110 A1 * | 7/2001 | Friggstad | 172/311 |
| 2002/0017389 A1 * | 2/2002 | Moser et al. | 172/311 |
| 2004/0069510 A1 * | 4/2004 | Dobson et al. | 172/311 |
| 2005/0126154 A1 * | 6/2005 | Tonutti | 56/377 |
| 2007/0056755 A1 * | 3/2007 | Pederson et al. | 172/311 |
| 2010/0293915 A1 * | 11/2010 | Westlake et al. | 56/365 |
| 2012/0132768 A1 * | 5/2012 | Lammerant et al. | 248/221.11 |

FOREIGN PATENT DOCUMENTS

WO      2010/122416      10/2010

* cited by examiner

*Primary Examiner* — Thomas B Will
*Assistant Examiner* — Mai T Nguyen
(74) *Attorney, Agent, or Firm* — Nixon Peabody LLP

(57) ABSTRACT

A side-delivery rake comprising a frame provided with at least a supporting arm to which a plurality of stellar wheels are associated. The supporting arm is pivoted to the frame so as to assume, by means of rotation around a pivoting element, at least a first working operating condition in which the stellar wheels carry out a gathering action, and a second transport operating condition, in which the stellar wheels are in a raised condition. Stop means are provided to determine the position of the supporting arms in the first operating condition. The stop means comprise an adjustment device which can be selectively associated with the frame in a finite plurality of predetermined discrete positions in order to define an adjustment of the position assumed by the supporting arm in the first operating condition.

13 Claims, 5 Drawing Sheets

SIDE-DELIVERY RAKE

FIELD OF THE INVENTION

The present invention concerns a side-delivery rake for gathering hay, forage, straw or other agricultural products, into one or more swathes. In particular, the side-delivery rake according to the present invention comprises a frame on which a plurality of stellar wheels are mounted rotatable, and which exert an elastic thrust on the hay to gather it. The side-delivery rake according to the present invention allows to vary the disposition of the stellar wheels with respect to the ground, between a lowered operating position, substantially in contact with the ground, and an inactive or transport position, raised from the ground.

U.S. Pat. No. 4,753,063 discloses a side-delivery rake having the features of the preamble of claim 1.

BACKGROUND OF THE INVENTION

Side-delivery rakes are known, to gather into swathes hay, forage, straw or agricultural products in general.

Side-delivery rakes are also known that comprise a trolleyed frame which is connected to a tractor and to which a plurality of stellar wheels are associated.

Each stellar wheel consists of a plurality of radial teeth that perform an action of elastic thrust on the hay, to form the swath.

Two supporting arms are associated on two opposite sides of the trolleyed frame and on each of them a plurality of stellar wheels are mounted.

Each of the supporting arms, in the working condition of the side-delivery rake, is configured so as to dispose the series of stellar wheels, in the longitudinal direction, converging toward the central zone of the trolleyed frame, so as to exert the gathering action on the hay.

The supporting arms are suitable to assume at least a first configuration in which they are disposed substantially parallel to the ground to allow the stellar wheels to exert the gathering action, and a second configuration or transport configuration, in which the stellar wheels are raised with respect to the ground for traveling by road.

It is also known that the arms are associated with actuator members, usually hydraulic actuators, which provide to take them to the first or second operating configuration.

The supporting arms are pivoted in correspondence with the trolleyed frame and are provided with stop elements, for example a protruding tooth solidly associated with the supporting arm. The tooth, cooperating mechanically with a fixed part of the trolleyed frame, determines the position of maximum and minimum angular travel of the supporting arm with respect to the trolleyed frame.

One disadvantage of some known side-delivery rakes is that, due to the irregularity of the ground, for example because of humps or slopes, the stellar wheels are not able to exert an appropriate gathering action, for example they do not gather the hay or they exert too high a pressure on the ground such as to raise the dust or earth and pollute the hay gathered. In some cases the teeth of the stellar wheels are also damaged.

Another disadvantage is that, even when suitable stop means of the arms are provided, the operator is not able to achieve a precise and rapid adjustment of the pressure of the stellar wheels. In particular, with known stop means, it is often very difficult to determine an identical inclination of the two supporting arms, obtaining a different adjustment of the pressure on the two arms.

One purpose of the present invention is to obtain a side-delivery rake that allows to adapt, substantially in all circumstances, the position of the stellar wheels with respect to the ground so as to optimize the gathering action.

Another purpose of the present invention is to obtain a side-delivery rake that allows to prevent damage to the stellar wheels and to reduce the wear on their teeth.

Another purpose of the present invention is to obtain a side-delivery rake that is versatile, simple and economical to produce.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a side-delivery rake according to the present invention comprises a frame provided with at least one supporting arm, advantageously two supporting arms disposed converging with each other, with each of which a plurality of stellar wheels are associated, suitable to allow a gathering action into swathes of hay, straw or agricultural products in general.

The supporting arm is pivoted to the frame to assume, by means of rotation around a pivoting element, at least a first operating working condition, in which the stellar wheels perform a gathering action, and a second operating transport condition, in which the stellar wheels are in a raised condition.

Furthermore, stop means are provided, to determine the position of the supporting arm in the first operating condition.

According to one feature of the present invention, the stop means comprise an adjustment device of the cam type, selectively associable to the frame in a finite plurality of discrete positions predetermined to define an adjustment of the position assumed by the supporting arm in the first operating condition, that is, its inclination with respect to the frame.

The term cam-type means, in the following, a geometric shape regular or irregular that define different distances from its center of rotation. A further definition of "cam-type" will be in the following "eccentric".

The adjustment device therefore allows to adjust, simply and quickly, the position assumed by the supporting arm, and hence by the stellar wheels, acting only on the sole adjustment device, so that the stellar wheels determine a desired pressure on the ground for the correct gathering action of the agricultural products.

Furthermore, if the side-delivery rake is provided with two supporting arms, given that the adjustment device assumes predetermined discrete positions, during the adjustment steps it is possible to obtain an identical adjustment of the pressure on both arms.

According to another feature, the adjustment device comprises an eccentric element, with a substantially cylindrical shape associated with a pin solid with the frame and selectively rotatable eccentrically with respect to the pin, so as to vary its position. In this way, depending on the eccentric position defined by the eccentric element with respect to the pin, it is possible to determine the desired adjustment of the supporting arms.

According to one form of embodiment, the eccentric element is provided with a selection peg and the frame, near the pin, is provided with a plurality of housing seatings in which, during the adjustment action, the selection peg is inserted so as to define the stable positioning of the eccentric element.

According to an advantageous form of embodiment, to simplify the operations to make the stop means, the pin and the housing seatings are present on a plate that is subsequently associated solidly with the frame.

According to another feature of the invention, support elements are pivoted to the supporting arm and each of them is provided to support one of the stellar wheels. Furthermore, shock-absorbing devices are associated with each support element to control its oscillation during the gathering and transport operations.

According to another feature of the invention, each of the support elements is associated with stop means suitable to limit the rotation of the latter, thus allowing to limit the oscillations of the support elements of the stellar wheels and to prevent damage to the shock-absorbing devices.

According to another feature of the present invention, the side-delivery rake comprises a rudder provided with a tubular body, hollow inside and solidly associated with a central body of the frame, and an extension element configured to be inserted telescopically into the tubular body, and solidly attached therewith by means of connection means.

According to another form of embodiment, the side-delivery rake according to the present invention comprises two adjacent supporting arms, converging towards each other and configured to be selectively associated with the frame so as to be disposed distanced from each other by a desired distance.

It is advantageous to provide, in other forms of embodiment, that the distance between the supporting arms of the stellar wheels is obtained by means of telescopic systems able to be selectively constrained to the frame of the side-delivery rake.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings.

DETAILED DESCRIPTION OF ONE FORM OF EMBODIMENT

Figure 1:
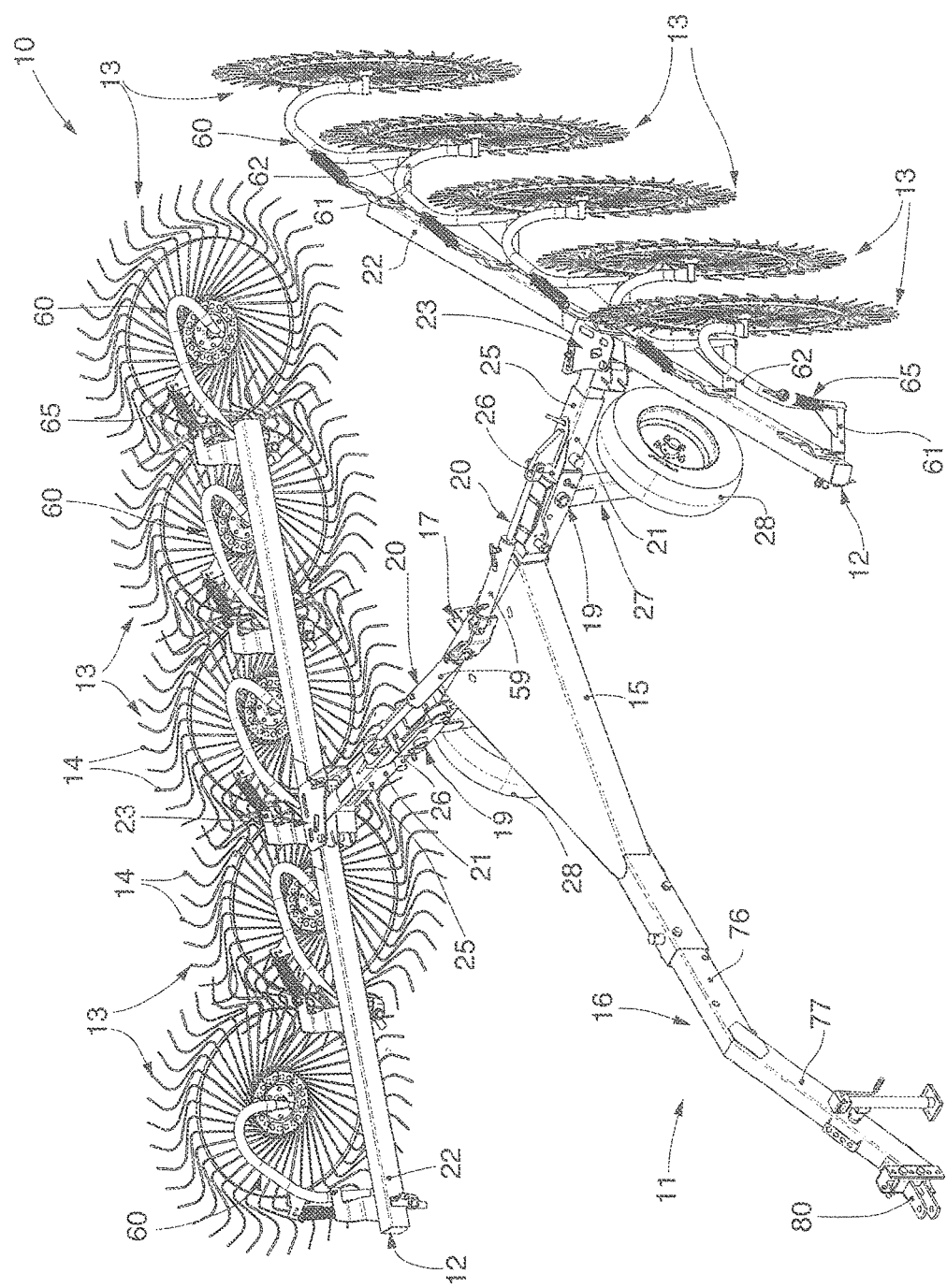
FIG. 1 is a perspective view of a side-delivery rake according to the present invention.

With reference to FIG. 1, a side-delivery rake is indicated in its entirety by the reference number 10 and comprises a trolleyed frame 11 provided with two supporting arms 12 to each of which a plurality of stellar wheels 13 are associated, in this case five for each supporting arm 12, each of them provided with a plurality of suitably shaped teeth 14.

Merely by way of example, each of the supporting arms 12 is suitable to support from three to six or more stellar wheels 13.

The trolleyed frame 11 comprises a central body 15, a rudder 16 associated to the front part of the central body 15, and a cross piece 17 that constitutes the rear part of the central body 15 and that is disposed transverse to the longitudinal extension of the trolleyed frame 11.

At the two opposite ends of the cross piece 17 of the trolleyed frame 11 support means 27 are associated, to support respectively two wheels 28.

The two supporting arms 12 (FIG. 1) are pivoted in correspondence with the support means 27 by means of pivoting means 19.

The supporting arms 12 can be therefore rotated around the pivoting means 19 to assume respectively a first working operating condition, in which the stellar wheels 13 are disposed in contact with the ground to perform a gathering action, and a second operating condition in which the stellar wheels 13 are in a raised condition or transport condition.

Stop means 20 are also associated with the pivoting means 19, and determine the adjustable positioning of the supporting arms 12 in the first operating condition as will be described hereafter.

More specifically, each of the supporting arms 12 (FIGS. 1, 4 and 5) comprises a first section shape 21 which in use is disposed substantially aligned on the same plane as the cross piece 17, and a second section shape 22 that extends transverse to the first section shape 21 and is suitable to support the stellar wheels 13, as will be described hereafter.

The first 21 and second section shape 22 in this case have a square or rectangular section, hollow inside, although it is not excluded that in other forms of embodiment the shape of the section may be different, or even solid.

Connection means 23, of a substantially known type, are provided to connect the first section shape 21, in proximity to a first end 25 thereof, with the second section shape 22.

More specifically, the connection means 23 are configured to dispose, in a known manner, one of the terminal ends of each of the second section shapes 22 converging toward the central part of the trolleyed frame 11.

Each of the support means 27 is substantially L-shaped, that is, it comprises a first segment 29 which in use is associated by means of screws 31 to the cross piece 17, and a second segment 30, orthogonal to the first segment 29, and to which one of the wheels 28 is associated.

The pivoting means 19 and the stop means 20 of each supporting arm 12 are disposed in correspondence with each of the first segments 29 (FIGS. 2 and 3) of the support means 27.

More specifically, the pivoting means 19 comprise a first through hole 34, made in correspondence with each first segment 29, a fork element 35, in turn provided with two second through holes 36, and a pin 37 suitable to be inserted through the second through holes 36 and the first through hole 34 to articulate in this way the supporting arm 12.

The fork element 35 comprises a first plate 41 and a second plate 42 that are disposed adjacent and solidly associated by welding to the first section shape 21.

The first plate 41 is provided with a tapered end 43 which, during use, functions as an abutment element as will be described hereafter.

The stop means 20 (FIG. 3) comprise a substantially L-shaped plate 46, provided at the end of one side with a protruding pin 47, and an eccentric, or cam-type, element 48 configured to be pivoted to the protruding pin 47 and to rotate eccentrically around it.

The shaped plate 46 is solidly associated with the support means 29 and is provided with a first through hole 53 which, when in place, is coaxial with the first through hole 34 of the first segment 29 and with the through holes 36 of the fork element 35, and through each of which the pin 37 is inserted.

The shaped plate 46 is also provided with a second hole 52 which during use is disposed coaxial with a hole made through, through the second segment 30 of the support means 27.

Figure 2:
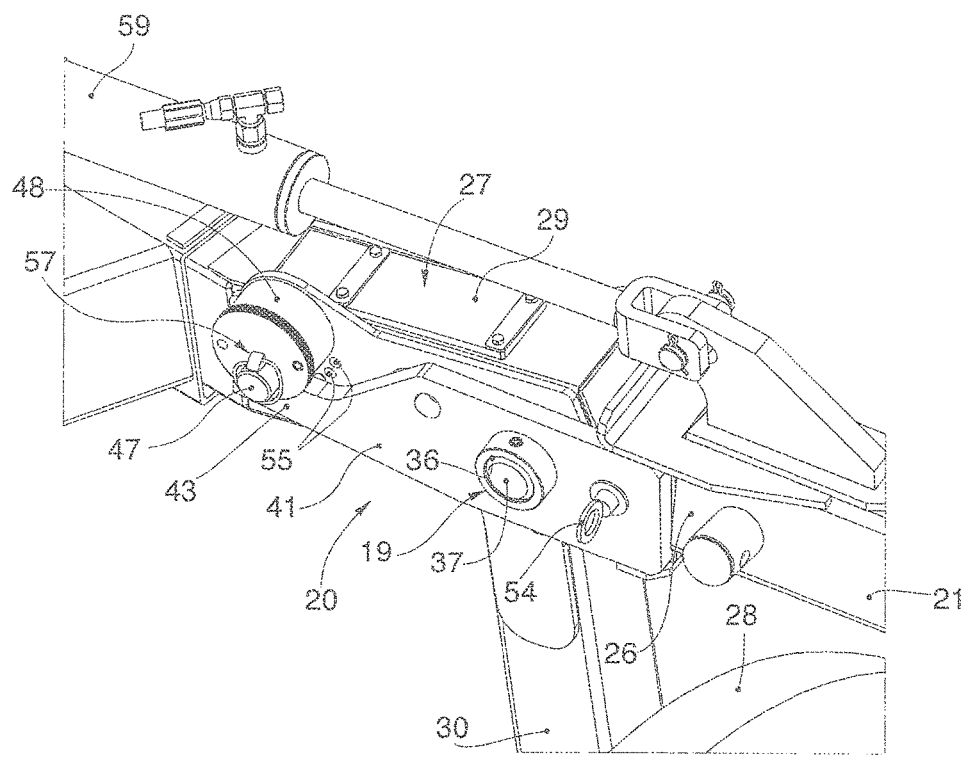
FIG. 2 is a perspective view of a first detail of FIG. 1.

In the second operating condition of the supporting arms 12, a peg 54 (which is shown in FIG. 2 in a condition of non-use), is inserted through through holes 95 (FIG. 3) made in the first 41 and second plate 42 and also through the second hole 52 of the shaped plate 46. In this way, any involuntary lowering of the supporting arms 12 is prevented, and a safety device of the supporting arms 12 is obtained, in the second working or transport condition.

The shaped plate 46, in correspondence with its protruding pin 47, is provided with a plurality of adjustment holes 55 made along a curved axis as will become clear hereafter.

The eccentric element 48 is substantially cylindrical in shape and is provided with a through hole 50 made offset with respect to the center of the eccentric element 48.

The eccentric element 48 is also provided, in correspondence with its circumferential perimeter, with a peg 51 (FIG. 3), configured to be inserted into one of the adjustment holes 55.

In particular, the eccentric element 48, rotating around the protruding pin 47, allows to insert the peg 51, by means of its axial sliding along the pin 47, into any one of the adjustment holes 55, thus assuming a stable position. Clamping means 57 (FIG. 2), in this case a rod insertable into a hole made in the protruding pin 47, allow to constrain the axial position of the eccentric element 48 along the protruding pin 47.

The eccentric element 48, with its circumferential surface, is suitable to cooperate with the tapered end 43 of the first plate 41 of the fork element 35, thus defining a position of maximum angular travel of the supporting arm 12.

Depending on the position where the peg 51 is inserted into the adjustment holes 55, it is possible to determine the angular position assumed by the supporting arm 12 in its first operating condition with respect to the ground. In this way, an overall adjustment is performed of the position assumed by the stellar wheels 13 of each of the two supporting arms 12 in the gathering condition, preventing conditions of excessive pressure of the stellar wheels 13 on the ground.

With the stop means 20 it is possible to dispose the supporting arm 12 inclined with respect to the cross piece and toward the ground by an angle α (FIG. 5) comprised between 0° and 25°, preferably between 10° and 20°, advantageously about 15°.

Figure 4:
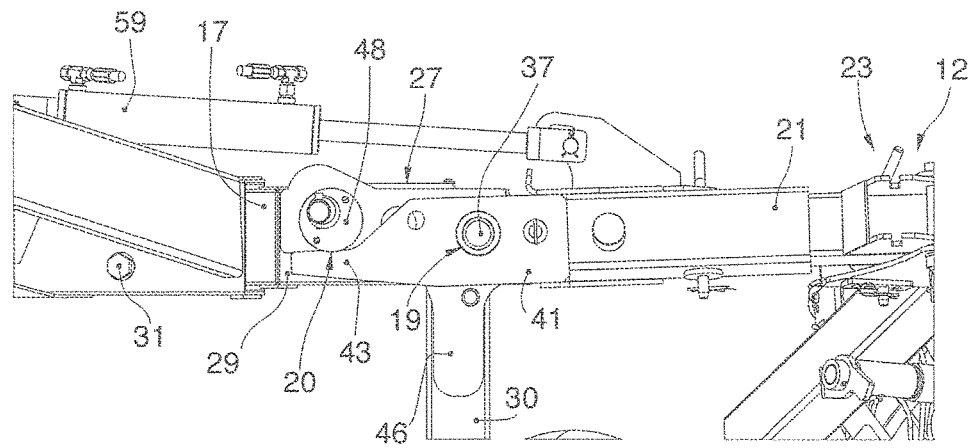
FIG. 4 is a front view of the detail in FIG. 2, in a first operating condition.
Figure 5:
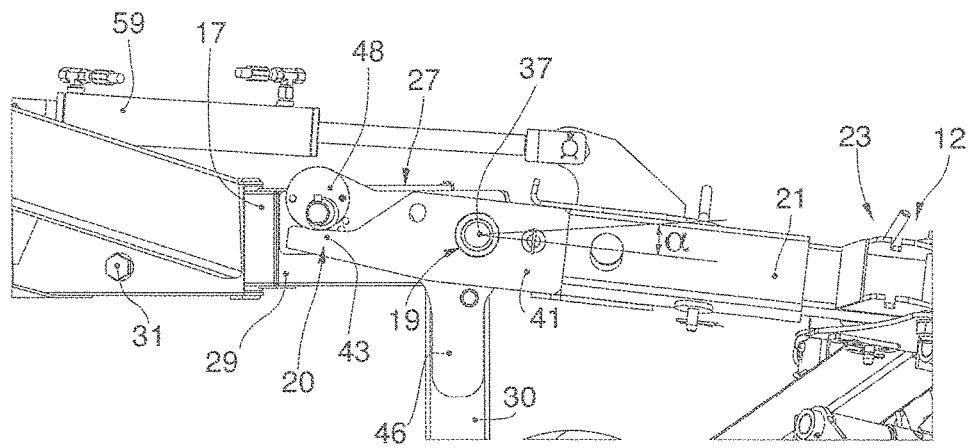
FIG. 5 is a front view of the detail in FIG. 2, in a second operating condition.

With reference to FIGS. 4 and 5, two extreme positioning configurations are shown of the supporting arms 12 in which, respectively, the stellar wheels 13 exert a minimum and maximum pressure on the ground.

In some forms of embodiment, it may be provided that the stop means 20 provide to keep the supporting arms 12 raised with respect to the horizontal, that is, inclined toward the upper part of the trolleyed frame 11.

Two hydraulic actuators 59 are associated with the cross piece 17 and with each of the first section shapes 21 of the two supporting arms 12, configured to take the supporting arms 12 into the first and second operating condition.

Figure 7:
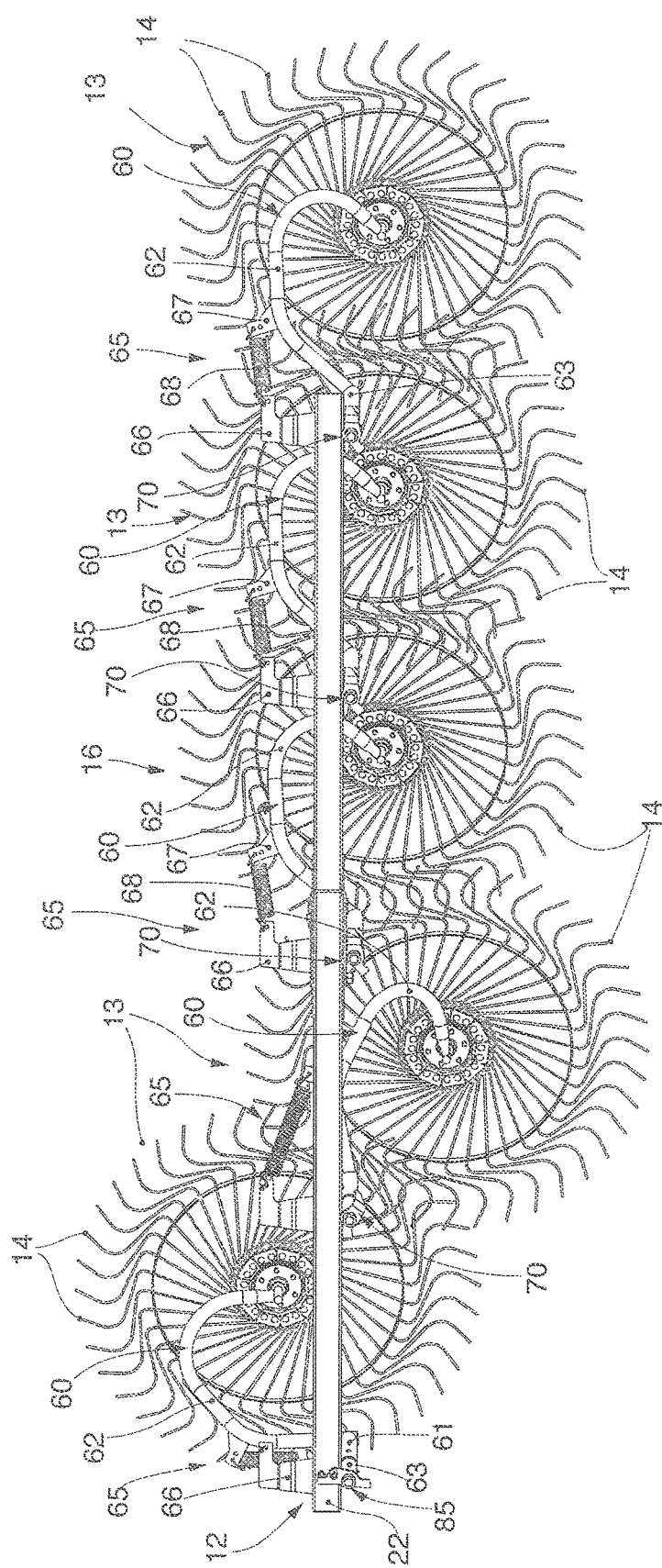
FIG. 7 is a lateral view of a third detail of FIG. 1.

Each of the stellar wheels 13 is mounted on the respective second section shape 22 of each supporting arm 12, by means of a respective support element 60 (FIGS. 1 and 7).

Each of the support elements 60 (FIG. 7) comprises a pivoting shaft 61 to which a shaped tubular element 62 is solidly associated, for example by welding.

Each pivoting shaft 61 is pivoted on a tube 63 (FIG. 9) which is welded in correspondence with the lower part of the second section shape 22.

At the free end of the shaped tubular element 62 (FIG. 7) one of the stellar wheels 13 is mounted idle.

Each support element 60 of the stellar wheels 13 is provided with a shock-absorbing device 65 which allows to adapt the position of the latter to the different conditions of the ground and the particular stresses to which one of the stellar wheels 13 is subjected during the gathering operations.

The shock-absorbing device 65 of each stellar wheel 13 comprises a first bracket 66 solid with the second section shape 22, a second bracket 67 solid with the shaped tubular element 62, and an elastic element, in this case a traction spring 68, which connects the first bracket 66 with the second bracket 67.

The first bracket 66 is attached, for example welded, to the second section shape 22, substantially in correspondence with, and on the opposite side with respect to that where the pivoting tube 63 is attached, the support element 60 considered, and its shaped tubular element 62 is disposed toward the rear part of the trolleyed frame 11.

In the normal gathering condition, the stellar wheels 13 are disposed with the respective teeth 14 substantially in contact with the ground. If the ground is irregular, thanks to the shock-absorbing device 65 the stellar wheels 13 can follow the discontinuities by rotating the shaped tubular element 62 with respect to the tube 63, in order to lower each of the stellar wheels 13 independently in correspondence with the discontinuities.

The traction spring 68 subsequently provides to return the stellar wheel 13 to its normal condition.

The shock-absorbing device 65 also provides to compensate possible vibrations to which the supporting arms 12 are subjected during movements.

Figure 8:
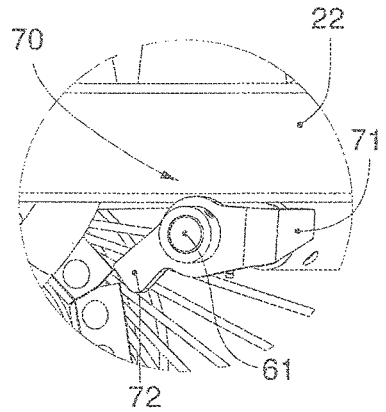
FIG. 8 is an enlarged first detail of FIG. 7.
Figure 9:
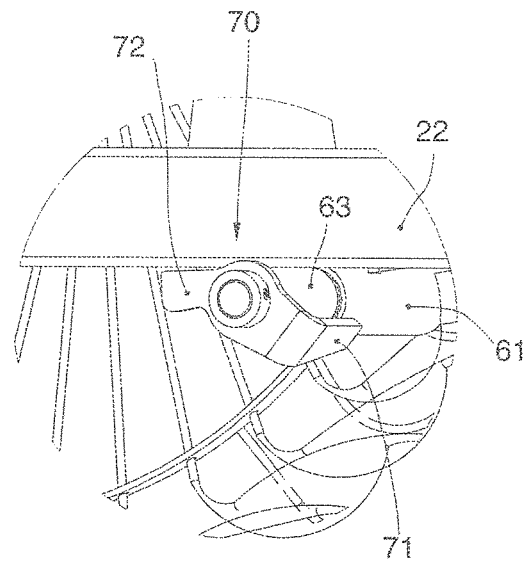
FIG. 9 is an enlarged second detail of FIG. 7.
Figure 10:
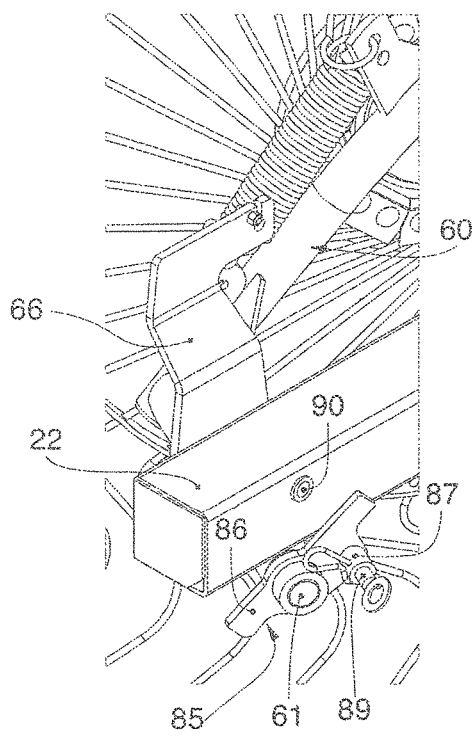
FIG. 10 shows an enlarged third detail of FIG. 7 in a first operating configuration.

To prevent too great an angular travel of the support elements 60, and hence to prevent damage to the teeth 14 of the stellar wheels 13, a first stop element 70 is solidly associated to each of the pivoting shafts 61 (FIGS. 8 and 9).

More specifically, the first stop element 70 is keyed to the pivoting shaft 61, rotates solidly with it and is provided with a first abutment tooth 71 and a second abutment tooth 72, opposite the first abutment tooth 71 and the fulcrum of rotation of the pivoting shaft 61.

In the transport condition, due to the oscillations of the trolleyed frame 11, the support elements 60 of the stellar wheels 13 are subject to a rotation around the respective tubes 63. In this condition the first 71 and second abutment tooth 72 interfere with the lower part of the second section shape 22 and therefore limit any angular travel.

The limitation of the angular travel of the support elements 60 prevents damage to the shock-absorbing devices 65 and in particular to the springs 68.

Figure 11:
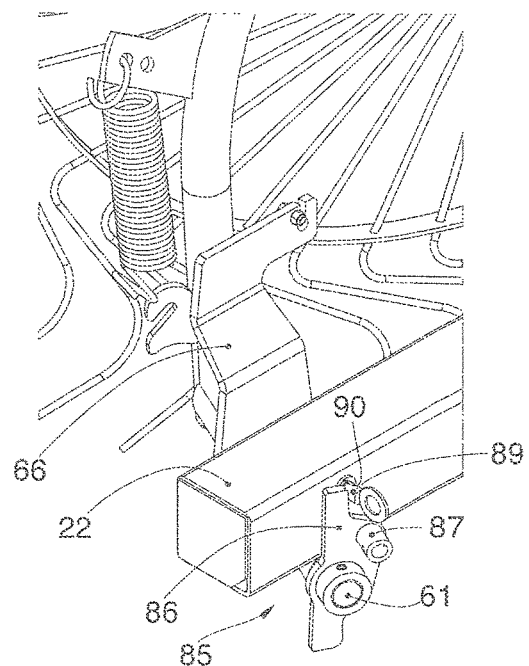
FIG. 11 shows the enlarged third detail of FIG. 7 in a second operating configuration.

In some forms of embodiment, it may be provided that the stellar wheel 13 disposed most upstream with respect to the direction of travel of the side-delivery rake 10, is provided with a second stop element 85 (FIGS. 7 and 11) instead of the first stop element 70; the second stop element 85 is suitable both to limit the angular travel of the support element 60 and also, possibly, to raise and keep raised the first stellar wheel 13 during the gathering operations.

The second stop element 85, unlike the first stop element 70, comprises a bracket 86 that is keyed to the pivoting shaft 61 and disposed transverse with respect to the longitudinal extension of the second section shape 22. The bracket 86 is provided at one end with a tubular element 87 for the through housing of a pin 89.

In the normal working condition of the stellar wheel 13 considered, the second stop element 85 intervenes on the oscillations of the support element 60, constraining its angular travel in the same way as provided for the first stop element 70. In particular, the stop action is obtained on one side by the pin 89 and on the other side by the end portion of the bracket 86.

If it is required to exclude the first stellar wheel 13 from the gathering operation, the pin 89 is removed from the tubular element 87 and inserted through a through hole 90 made in the second section shape 22.

In this case, once the pin 89 has been removed from the tubular element 87, the support element 60 is rotated to raise the stellar wheel 13, and the pin 89 is inserted into the through hole 90. The interference between the pin 89 and the end portion of the bracket 86 prevents the support element 60 from rotating in one direction of rotation.

The same end portion, interfering against the second section shape 22, also prevents rotation in the other direction.

In the cases shown in FIGS. 7-11, the first 70 and the second stop elements 85 allow the support element 60 to rotate by about 25°-30°. Consequently, with regard to the first stop element 70, the first abutment tooth 71 and the second abutment tooth 72 are angularly offset by an angle of about 150°-155°.

Each shock-absorbing device 65 intervenes autonomously and independently on each stellar wheel 13 to adapt to the specific irregularities of the ground or to stresses imparted in the transport condition.

Figure 6:
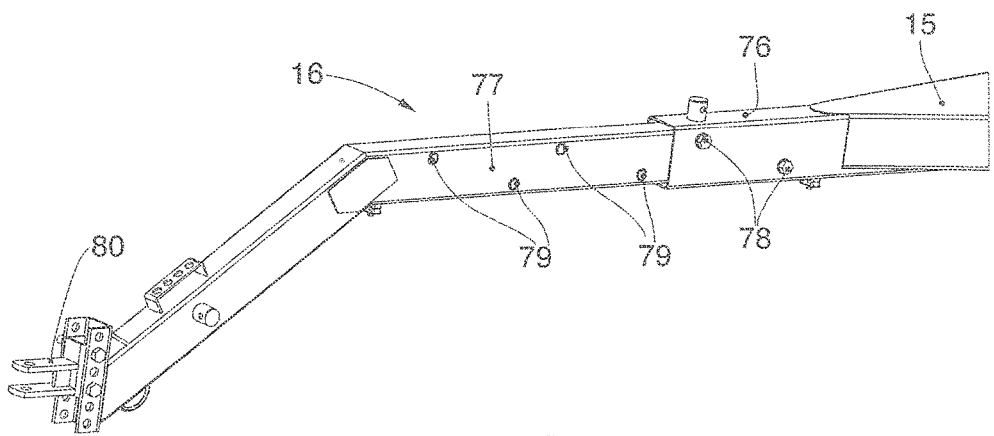
FIG. 6 shows a second detail of FIG. 1.

To increase the production flexibility of the side-delivery rake 10 (FIG. 1) according to the present invention, the rudder 16 comprises a hollow tubular body 76 which is solidly associated with the central body 15, and an extension element 77 provided with an attachment 80 for the drawing mean and telescopically inserted into the tubular body 76, and is solidly attached thereto by means of connection means 78 (FIG. 6), in this case two bolts.

The extension element 77 is provided, along its longitudinal extension and at regular intervals, with a plurality of pairs of through holes 79, each of which is made in the position in which the bolts 78 are disposed in the tubular body 76.

It is therefore possible to attach the extension element 77 at different lengths with respect to the tubular body 76, thus varying the overall length of the rudder 16.

This form of embodiment is advantageous both in the production and assembly step of the side-delivery rake 10 according to the present invention, since it allows the constructor to adapt the trolleyed frame 11 to the overall sizes required by the client, that is, the number of stellar wheels 13 that each supporting arm 12 is configured to support, and also subsequently for possible variations in the tonnage, due to a reduction or increase in the stellar wheels 13 that might be required.

Figure 3:
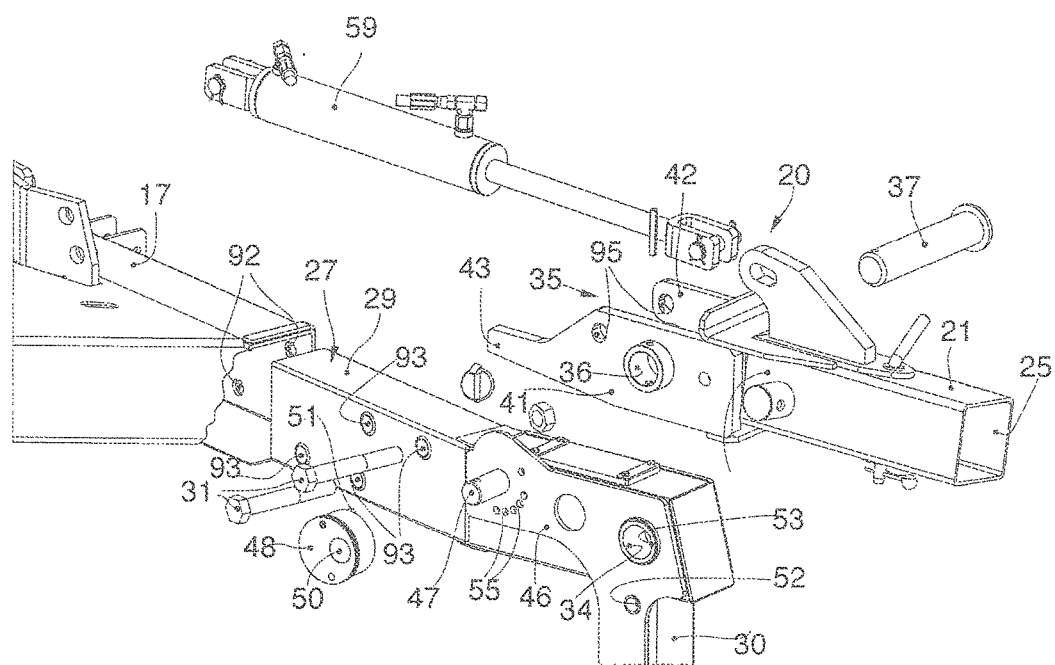
FIG. 3 is an exploded view of FIG. 2.

In the same way it may be provided that the support means 27 can also be associated with the cross piece 17, and in particular in correspondence to a first pair of through holes 92, in different positions as shown in FIG. 3.

In this case, in fact, it may be provided that the first segment 29 of the support means 27 is provided with second pairs of through holes 93 each of which is made in a reciprocal disposition coordinated with that of the first pair of through holes 92.

The first segment 29 of the support means 27 is inserted telescopically into the cross piece 17 so as to dispose the first pair of holes 92 coinciding with one of the second pairs of holes 93, to allow the insertion of the screws 31 and hence its attachment.

In this case, the actuators 59 can be connected to the central body 15 or to the cross piece 17 by means of suitable shaped, welded or extension brackets.

It is clear that modifications and/or additions of parts may be made to the side-delivery rake 10 as described heretofore, without departing from the field and scope of the present invention.

The same effect of varying the distance between the supporting arms 12 can be obtained by associating telescopically the connection means 23 to the first section shape 21 of the supporting arm 12.

It is also clear that, although the present invention has been described with reference to some specific examples, a person of skill in the art shall certainly be able to achieve many other equivalent forms of side-delivery rake, having the characteristics as set forth in the claims and hence all coming within the field of protection defined thereby.

The invention claimed is:

1. A side-delivery rake comprising a frame provided with at least a supporting arm to which a plurality of stellar wheels are associated, said supporting arm being pivoted to said frame so as to assume, by means of rotation around a pivoting element, at least a first working operating condition in which said stellar wheels carry out a gathering action, and a second transport operating condition, in which said stellar wheels are in a raised condition, stop means being provided to determine the position of said supporting arms in said first operating condition, said stop means further comprising an adjustment device of the cam type selectively associated with said frame in a finite plurality of predetermined discrete positions in order to define an adjustment of the position assumed by said supporting arm in said first operating condition, wherein said adjustment device of the cam type comprises an eccentric element with a substantially cylindrical shape associated with a pin solid with said frame and selectively rotatable in an eccentric manner with respect to said pin.

2. The side-delivery rake as in claim 1, wherein said eccentric element is provided with a selection peg, and wherein said frame is provided with a plurality of housing seatings disposed in proximity to said pin, said selection peg being insertable into one of said housing seatings to define the positioning of said eccentric element.

3. The side-delivery rake as in claim 1, wherein said supporting arm comprises a fork element provided with pivoting holes provided to pivot said supporting arm to said frame, and wherein said fork element is provided with at least a contrast portion configured to contact said eccentric element and to determine the positioning of said supporting arm in said first operating position.

4. The side-delivery rake as in claim 2, wherein said frame comprises, solidly associated therewith, a plate on which said pin is attached and on which said housing seatings are made.

5. The side-delivery rake as in claim 1, wherein support elements are pivoted to said supporting arm and each of these is provided in order to support one of said stellar wheels, shock-absorbing devices being associated with each support element to control its oscillation.

6. The side-delivery rake as in claim 5, wherein said shock-absorbing device comprises a first bracket solid with said supporting arm, a second bracket solid with said support element, and an elastic element which reciprocally connects said first bracket to said second bracket.

7. The side-delivery rake as in claim 6, wherein said elastic element comprises a traction spring suitable to return said support element to an inactive condition when it is rotated.

8. The side-delivery rake as in claim 6, wherein each of said support elements is associated with a stop element suitable to limit the rotation of the latter.

9. The side-delivery rake as in claim 8, wherein said stop element comprises a first abutment tooth and a second abutment tooth, opposite with respect to the first abutment tooth, and to the rotation fulcrum of said support element.

10. The side-delivery rake as in claim 8, wherein at least one of said stop elements is configured to assume a stable working condition in which it is suitable to maintain the corresponding stellar wheel raised from the ground during at least said first operating condition.

11. The side-delivery rake as in claim 1, comprising a rudder provided with a tubular body, hollow internally, solidly associated with a central body of the frame, and an extension element configured to be inserted telescopically into the tubular body, and to be solidly attached thereto by means of connection means.

12. The side-delivery rake as in claim 11, wherein said extension element is provided, along its longitudinal extension, with a plurality of pairs of through holes, each of which is made according to the position in which the connection means provided in the tubular body are disposed.

13. The side-delivery rake as in claim 1, comprising two supporting arms adjacent and converging with respect to each other and configured to be selectively associated with said frame so as to be disposed distanced from each other by a desired distance.

* * * * *